(12) United States Patent
Wang et al.

(10) Patent No.: US 12,488,132 B2
(45) Date of Patent: Dec. 2, 2025

(54) SYSTEMATIC SECURITY PROTECTION METHOD FOR MULTIMODAL AI MODEL, APPARATUS AND DEVICE

(71) Applicant: HANGZHOU HIKVISION DIGITAL TECHNOLOGY CO., LTD., Hangzhou (CN)

(72) Inventors: Bin Wang, Hangzhou (CN); Haonan Yan, Hangzhou (CN); Wei Wang, Hangzhou (CN); Chao Li, Hangzhou (CN); Kezhang Lin, Hangzhou (CN); Xiaohong Guan, Hangzhou (CN); Xing Wang, Hangzhou (CN); Li Wan, Hangzhou (CN)

(73) Assignee: Hangzhou Hikvision Digital Technology Co., Ltd., Hangzhou (CN)

( * ) Notice: Subject to any disclaimer, the term of this patent is extended or adjusted under 35 U.S.C. 154(b) by 0 days.

(21) Appl. No.: 19/184,730

(22) Filed: Apr. 21, 2025

(65) Prior Publication Data
US 2025/0328671 A1 Oct. 23, 2025

(30) Foreign Application Priority Data
Apr. 22, 2024 (CN) .......................... 202410487472.8

(51) Int. Cl.
G06F 21/62 (2013.01)
(52) U.S. Cl.
CPC ................................ G06F 21/6218 (2013.01)
(58) Field of Classification Search
CPC .................................................. G06F 21/6218
(Continued)

(56) References Cited

U.S. PATENT DOCUMENTS

| 6,091,773 A | * | 7/2000 | Sydorenko | ........... H04N 19/124 375/240.03 |
| 2016/0070917 A1 | * | 3/2016 | Rozenberg | .......... G06F 21/6254 726/26 |

(Continued)

FOREIGN PATENT DOCUMENTS

| CN | 112926052 A | 6/2021 |
| CN | 114548428 A | 5/2022 |

(Continued)

OTHER PUBLICATIONS

Yang, Yuxing, Junhao Zhao, Siyi Wang, Xiangyu Min, Pengchao Wang, and Haizhou Wang. "Multimodal short video rumor detection system based on contrastive learning." arXiv preprint arXiv:2304.08401 (2023). (Year: 2023).*

(Continued)

Primary Examiner — Luu T Pham
Assistant Examiner — Walter J Malinowski
(74) Attorney, Agent, or Firm — Fish & Richardson P.C.

(57) ABSTRACT

A systematic security protection method for a multimodal AI model is provided. The method comprises: in a security detection stage of the target multimodal AI model, according to a perceptual distance between detection data and original data determined by a trained distance-aware judgment model, obtaining detection data whose perceptual distance from the original data meets a requirement, and detecting the target multimodal AI model by using the detection data; in a case that the detection result in the detection stage is that the target multimodal AI model has a security problem, on one hand, performing security coding protection and tokenization filtering on the input of the model, on the other hand, performing multi-dimensional omnidirectional evaluation on the multimodal AI model.

8 Claims, 4 Drawing Sheets

(58) Field of Classification Search
USPC .......................................................... 726/26
See application file for complete search history.

(56) References Cited

U.S. PATENT DOCUMENTS

| | | | | |
|---|---|---|---|---|
| 2016/0112064 | A1* | 4/2016 | Dalton | G06F 3/0683 |
| | | | | 341/106 |
| 2018/0146626 | A1* | 5/2018 | Xu | A01G 9/20 |
| 2018/0288063 | A1* | 10/2018 | Koottayi | G06F 21/50 |
| 2019/0349733 | A1* | 11/2019 | Nolan | H04W 12/69 |
| 2020/0352518 | A1* | 11/2020 | Lyman | A61B 6/5258 |
| 2021/0012165 | A1* | 1/2021 | Jiang | G01S 13/867 |
| 2022/0004875 | A1* | 1/2022 | Koike-Akino | G06N 3/045 |
| 2022/0057519 | A1* | 2/2022 | Goldstein | G01S 17/88 |
| 2022/0067294 | A1* | 3/2022 | Chikoti | G06F 16/24573 |
| 2022/0215948 | A1* | 7/2022 | Bardot | G16H 40/40 |
| 2022/0311596 | A1* | 9/2022 | Boesgaard | H04L 9/0625 |
| 2022/0360597 | A1* | 11/2022 | Fellows | H04L 51/212 |
| 2022/0405537 | A1* | 12/2022 | Yang | G06F 18/256 |
| 2023/0086191 | A1* | 3/2023 | Jakobsson | H04L 9/3231 |
| | | | | 705/66 |
| 2023/0095870 | A1* | 3/2023 | Du | H04L 63/1416 |
| | | | | 726/23 |
| 2023/0195903 | A1* | 6/2023 | Yan | G06F 21/577 |
| | | | | 726/25 |
| 2023/0237229 | A1* | 7/2023 | Yuan | G06F 30/3312 |
| | | | | 716/132 |
| 2023/0281400 | A1 | 9/2023 | Wang et al. | |
| 2024/0161017 | A1* | 5/2024 | Pisner | G16H 50/20 |
| 2024/0265124 | A1* | 8/2024 | Frattura | G06F 21/6218 |
| 2024/0340302 | A1* | 10/2024 | Wang | G06N 20/00 |
| 2024/0419246 | A1* | 12/2024 | Ullrich | G10L 13/08 |
| 2024/0427879 | A1* | 12/2024 | Bulut | G06F 21/554 |
| 2025/0053876 | A1* | 2/2025 | Upadhyay | G06N 20/00 |

FOREIGN PATENT DOCUMENTS

| | | | |
|---|---|---|---|
| CN | 114757753 A | * | 7/2022 |
| CN | 114915398 A | * | 8/2022 |
| CN | 115376045 A | | 11/2022 |
| CN | 116561305 A | | 8/2023 |
| CN | 117493674 A | | 2/2024 |
| CN | 117671450 A | | 3/2024 |
| CN | 118094176 B | | 6/2024 |
| KR | 20220111634 A | | 8/2022 |
| WO | WO 2023065619 A1 | | 4/2023 |

OTHER PUBLICATIONS

Jiao, Licheng, Xin Zhang, Xu Liu, Fang Liu, Shuyuan Yang, Wenping Ma, Lingling Li et al. "Transformer meets remote sensing video detection and tracking: A comprehensive survey." IEEE Journal of Selected Topics in Applied Earth Observations and Remote Sensing 16 (2023): 1-45. (Year: 2023).*

He et al., "Survey of Research on Multimodal Fusion Technology for Deep Learning," Computer Engineering, May 2020, 46(5):1-11 (with English abstract).

Lou, "Detection Methods of Fake News for Social Networks," Journal of Zhejiang Institute of Communications, Jun. 2020, 21(2):106-110, 6 pages (with English abstract).

Notice of Allowance in Chinese Application No. 202410487472.8, mailed on May 30, 2024, 12 pages (with English translation).

Zou et al., "Emotion recognition neural network based on auxiliary modal supervised training," Journal of Hebei University of Science and Technology, Oct. 2020, 41(5):424-432 (with English abstract).

* cited by examiner

S100: In a security detection stage of a target Multimodal AI Model, according to a perceptual distance between detection data and original data determined by a trained Distance-Aware judgment model, detection data of which a perceptual distance from the original data meets a requirement is obtained, and detection is performed on the target Multimodal AI Model by using the obtained detection data, where the detection data is generated based on the original data; the distance-aware judgment model determines the perceptual distance between the original data and the detection data according to two metrics: a distance from an original feature to a target mean value and a distance from a detection feature to the target mean value, where the original feature is a feature obtained by the Distance-Aware judgment model processing the input original data; the detection feature is a feature obtained by the Distance-Aware judgment model processing the input detection data; the target mean value is an average of the original feature and the detection feature across all dimensions of a feature space; where the smaller the perceptual distance between the original data and the detection data is, the higher the similarity between the original data and the detection data is In a case where a detection result in a detection stage is that the target Multimodal AI Model has a security problem S110: Perform security encoding protection on input of the target Multimodal AI Model by using a trained security encoder to obtain a security coding sequence feature; wherein the security encoder adopts a multi-stream multi-modal Transformer network architecture, and the multi-stream multi-modal Transformer network architecture comprises a plurality of parallel Transformers and a cross-attention module responsible for information interaction among modalities, the plurality of parallel Transformers are respectively used for modeling coding sequences of different modalities, and the cross-attention module is used for integrating outputs of the plurality of parallel transformers S120: Perform Term Tokenization Processing on the security coding sequence feature, and perform filtering detection on obtained Tokens S130: In a case where a Token needing to be filtered is detected, filter the Token, and perform Gap Filling on the filtered security coding sequence feature to obtain a filtering processed security coding sequence feature S140: Input the filtering processed security coding sequence feature into the target Multimodal AI Model, so that the target Multimodal AI Model outputs an output result corresponding to the filtering processed security coding sequence feature S150: Perform multi-dimensional assessment on the target Multimodal AI Model according to a plurality of preset evaluation dimensions to respectively obtain a score of each evaluation dimension in the plurality of evaluation dimensions corresponding to the target Multimodal AI Model S160: Determine a comprehensive score of the target Multimodal AI Model by using a correlation-based re-normalization method according to the score of each evaluation dimension

FIG. 1

SYSTEMATIC SECURITY PROTECTION METHOD FOR MULTIMODAL AI MODEL, APPARATUS AND DEVICE

CROSS REFERENCE TO RELATED APPLICATIONS

This application claims priority to Chinese Patent Application No. 2024104874728, filed on Apr. 22, 2024, which is incorporated herein by reference in its entirety for all purposes.

TECHNICAL FIELD

The present disclosure relates to the field of network security and artificial intelligence, in particular, to a systematic security protection method, apparatus and device for a Multimodal AI (Artificial Intelligence) Model.

BACKGROUND

Multimodal AI models are artificial intelligence models that can process and understand multiple types of data (such as texts, images, audio, etc.). These models can simultaneously utilize different types of data to improve the understanding and performance of tasks.

With the popularity of multimodal AI models, security protection for multimodal AI models has become a research hot spot.

SUMMARY

In view of this, the present disclosure provides a systematic security protection method, apparatus, and device for a multimodal AI model.

Specifically, the present disclosure is implemented by the following technical schemes.

According to a first aspect of an embodiment of the present disclosure, there is provided a systematic security protection method for a multimodal AI model, including:

in a security detection stage of a target multimodal AI model, according to a perceptual distance between detection data and original data determined by a trained distance-aware judgment model, obtaining detection data of which a perceptual distance from the original data meets a requirement, and detecting the target multimodal AI model by using the obtained detection data; where the detection data is generated according to the original data, and the perceptual distance between the detection data and the original data is determined by the distance-aware judgment model according to a distance from an original feature to a target mean value and a distance from a detection feature to the target mean value, where the original feature is a feature obtained through processing input original data by the distance-aware judgment model; the detection feature is a feature obtained through processing input detection data by the distance-aware judgment model; the target mean value is an average of the original feature and the detection feature across all dimensions of a feature space; the smaller the perceptual distance between the original data and the detection data is, the higher a similarity between the original data and the detection data is;

in a case where a detection result in the detection stage is that the target multimodal AI model has a security problem, performing security encoding protection on input of the target multimodal AI model by using a trained security encoder to obtain a security coding sequence feature; where the security encoder adopts a multi-stream multimodal Transformer network architecture, and the multi-stream multimodal Transformer network architecture includes a plurality of parallel Transformers and a cross-attention module responsible for information interaction among modalities, the plurality of parallel Transformers are respectively used for modeling coding sequences of different modalities, and the cross-attention module is used for integrating outputs of the plurality of parallel Transformers;

performing term tokenization processing on the security coding sequence feature to obtain tokens, and performing filtering detection on the obtained tokens;

in a case where a token needing to be filtered is detected, filtering the Token, and performing gap filling on the security coding sequence feature having filtered the token to obtain a filtering-processed security coding sequence feature;

inputting the filtering-processed security coding sequence feature into the target multimodal AI model, so that the target multimodal AI model outputs an output result corresponding to the filtering-processed security coding sequence feature;

in a case where the detection result in the detection stage is that the target multimodal AI model has a security problem, performing an omnidirectional comprehensive performance evaluation on the target multimodal AI model, including:

performing a multi-dimensional evaluation on the target multimodal AI model according to a plurality of preset evaluation dimensions to obtain a score of the target multimodal AI model corresponding to each evaluation dimension in the plurality of evaluation dimensions;

determining a comprehensive score of the target multimodal AI model by using a correlation-based re-normalization method according to the score of each evaluation dimension.

According to a second aspect of an embodiment of the present disclosure, there is provided a systematic security protection apparatus for a multimodal AI model, including:

a detection unit, configured to, in a security detection stage of the target multimodal AI model, according to a perceptual distance between detection data and original data determined by a trained distance-aware judgment model, obtain detection data whose perceptual distance from the original data meets a requirement, and detect the target multimodal AI model by using the detection data; where the detection data is generated according to the original data, and the perceptual distance between the original data and the detection data is determined by the distance-aware judgment model according to a distance from an original feature to a target mean value and a distance from a detection feature to the target mean value, where the original feature is obtained through processing input original data by the distance-aware judgment model; the detection feature is obtained through processing input detection data by the distance-aware judgment model; the target mean value is an average of the original feature and the detection feature across all dimensions of a feature space; the smaller the perceptual distance between the original data and the detection data is, the higher a similarity between the original data and the detection data is;

a protection unit, configured to, in a case where a detection result in a detection stage is that the target multimodal AI model has a security problem, perform security encoding protection on input of the target multimodal AI model by using a trained security encoder to obtain a security coding sequence feature; where the security encoder adopts a multi-stream multimodal Transformer network architecture, and the multi-stream multi-modal Transformer network architecture includes a plurality of parallel Transformers and a cross-attention module responsible for information interaction among modalities, the plurality of parallel Transformers are respectively used for modeling coding sequences of different modalities, and the cross-attention module is used for integrating outputs of the plurality of parallel transformers, perform term tokenization processing on the security coding sequence feature to obtain Token, and perform filtering detection on the obtained tokens; in a case where a token needing to be filtered is detected, filter the token, and perform gap filling on the filtered security coding sequence feature to obtain a filtering processed security coding sequence feature, input the filtering processed security coding sequence feature into the target multimodal AI model, so that the target multimodal AI model outputs an output result corresponding to the filtering processed security coding sequence feature;

an evaluation unit, configured to, in a case where the detection result in the detection stage is that the target multimodal AI model has a security problem, perform omnidirectional comprehensive performance evaluation on the target multimodal AI model, including: performing multi-dimensional evaluation on the target multimodal AI model according to a plurality of preset evaluation dimensions to respectively obtain a score of each evaluation dimension in the plurality of evaluation dimensions corresponding to the target multimodal AI model; determining a comprehensive score of the target multimodal AI model by using a correlation-based re-normalization method according to the score of each evaluation dimension.

According to a third aspect of the embodiments of the present disclosure, there is provided an electronic device, including a processor and a storage, where the storage is configured to store a computer program;

the processor is configured to perform the method according to the first aspect when executing the program stored on the storage.

According to a fourth aspect of the embodiments of the present disclosure, there is provided a computer program product storing a computer program which, when executed by a processor, cause the processor to perform the method provided by the first aspect.

According to the systematic security protection method for the multimodal AI model, in the security detection stage of the target multimodal AI model, by constructing and training the distance-aware judgment model, the perceptual distance between the original data and the generated data is determined by using the trained distance-aware judgment model, and the generated data of which the perceptual distance from the original data meets the requirements is obtained. And the target multimodal AI model is detected by using the obtained generated data to optimize the detection effect of the target multimodal AI model. In a case that the target multimodal AI model has a security problem, on the one hand, security coding protection is performed on the input of the target multimodal AI model by utilizing a security encoder to obtain a security coding sequence feature, term tokenization processing is performed on the security coding sequence feature to obtain tokens, filtering detection is performed on the obtained tokens, and in a case that a token needing to be filtered is detected, filtering is performed on the token, then gap filling is performed on the filtered security coding sequence feature to obtain a filtering-processed security coding sequence feature, then the filtering-processed security coding sequence feature is input into the target multimodal AI model, so that the target multimodal AI model outputs an output result corresponding to the filtering-processed security coding sequence feature. Through secure coding and tokenization filtering, the security protection of the multimodal AI model is effectively realized, and the security of the multimodal AI model is improved. On the other hand, according to a plurality of preset evaluation dimensions, the multi-dimensional evaluation is performed on the target multimodal AI model to respectively obtain the score of the target multimodal AI model corresponding to each evaluation dimension in the plurality of evaluation dimensions, and according to the score of each evaluation dimension, a correlation-based re-normalization method is utilized to determine the comprehensive score of the target multimodal AI model. The omnidirectional comprehensive performance evaluation of the target multimodal AI model is realized, the reliability and accuracy of the model performance evaluation are improved, and the security of the multimodal AI model is systematically improved through the integrated operations of detection, defense and evaluation.

BRIEF DESCRIPTION OF DRAWINGS

FIG. 1 is a schematic flowchart illustrating a systematic security protection method for a multimodal AI model according to an example of the present disclosure.

DETAILED DESCRIPTION

Figure 2:
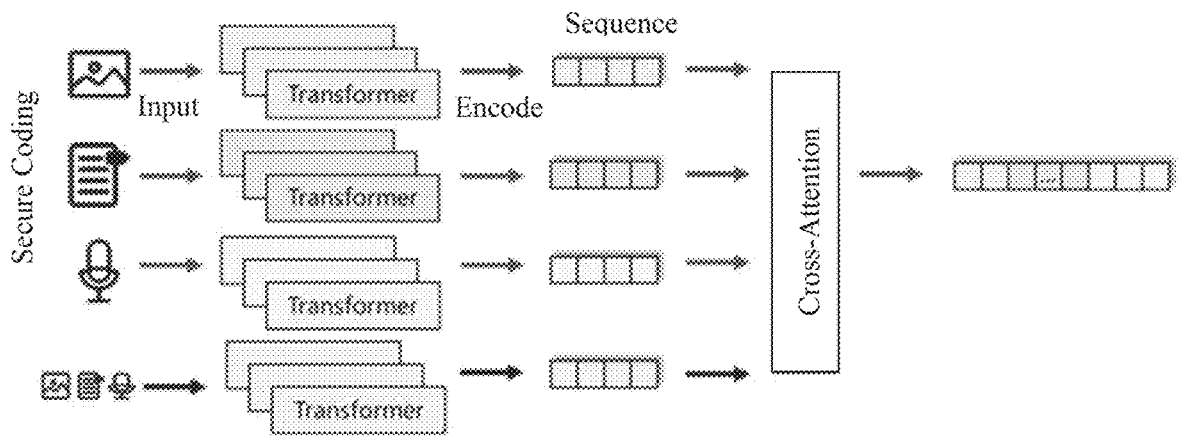
FIG. 2 is a schematic structural diagram illustrating a security encoder according to an example of the present disclosure.

Reference will now be made in detail to exemplary embodiments, examples of which are illustrated in the accompanying drawings. When the following description relates to the accompanying drawings, the same numbers in different drawings indicate the same or similar elements, unless otherwise indicated. The implementations described in the following exemplary embodiments are not intended to be all that are consistent with the embodiments of the disclosure. Rather, they are merely examples of apparatus and methods consistent with some aspects of the present disclosure as detailed in the appended claims.

The terms used in the present disclosure are for the purpose of describing particular embodiments only and are not intended to limit the present disclosure. As used in the present disclosure and the append claims, the singular forms "a", "an", and "the" are intended to include the plural form as well, unless the context clearly dictates otherwise.

In order to enable those skilled in the art to better understand the technical solutions provided in the embodiments of the present disclosure, and to enable the foregoing objects, features, and advantages of the embodiments of the present disclosure to be more clear and understandable, the technical solutions in the embodiments of the application are described in further detail in the following with reference to the accompanying drawings.

Referring to FIG. 1, it is a schematic flow chart illustrating a systematic security protection method for a multimodal AI model provided in an embodiment of the present disclosure. As shown in FIG. 1, the systematic security protection method for a multimodal AI model may include following steps.

In step S100, in a security detection stage of a target multimodal AI model, according to a perceptual distance between detection data and original data determined by a trained distance-aware judgment model, detection data of which a perceptual distance from the original data meets a requirement is obtained, and detection is performed on the target multimodal AI model by using the obtained detection data, where the detection data is generated based on the original data; the distance-aware judgment model determines the perceptual distance between the original data and the detection data according to two metrics: (1) a distance from an original feature to a target mean value and (2) a distance from a detection feature to the target mean value, where the original feature is a feature obtained by the distance-aware judgment model processing the input original data; the detection feature is a feature obtained by the distance-aware judgment model processing the input detection data; the target mean value is an average of the original feature and the detection feature across all dimensions of a feature space; where the smaller the perceptual distance between the original data and the detection data is, the higher the similarity between the original data and the detection data is.

In the embodiment of the present disclosure, considering that existing quality evaluation indexes, such as L2, Peak Signal-to-Noise Ratio (PSNR), Structural Similarity Index (SSIM), etc., cannot fully evaluate the quality of various types of generated multimodal detection data, a new metric that better fits the reality and human perceptual situation needs to be designed.

Based on this, a feature similarity relevance evaluation method based on perceptual learning may be designed, which uses intelligence models to learn fitting the judgment rules of human for perceptual similarity of multimodal data, and calculate a perceptual distance between two generated samples based on this, so as to effectively evaluate the quality and similarity of the generated detection data, thereby better controlling the quality and relevance of the generated data, to better perform internal vulnerability mining tests (such as poisoning sample attacks) and external threat detection tests (such as countering sample attacks).

Accordingly, for any multimodal AI model (which may be referred to as a target multimodal AI model), in a detection stage of the target multimodal AI model, the determination of whether the perceptual distance meets the requirement may by performed by using a perceptual distance between the detection data and the original data determined by the trained distance-aware judgment model.

In a case where the perceptual distance does not meet the requirement, for example, the perceptual distance exceeds a preset perceptual distance threshold, generation of the detection data may be performed again.

In a case where the perceptual distance meets the requirement, for example, the perceptual distance does not exceed the preset perceptual distance threshold, the currently generated detection data may be used for performing security detection on the target multimodal AI model.

For example, the distance-aware judgment model may determine the perceptual distance between the original data and the detection data according to the distance from the original feature to the target mean value, and the distance from the detection feature to the target mean value.

The original feature is a feature obtained by processing the input original data by the distance-aware judgment model. The detection feature is a feature obtained by processing the input detection data by the distance-aware judgment model.

The target mean value is an average of the original feature and the detection feature across all dimensions of a feature space.

The original data is collected regular sample data. And the detection data can be data generated by adding disturbance to the original data.

In step S110, when the detection result in the detection stage is that the target multimodal AI model has a security problem, security coding protection is performed on the input of the target multimodal AI model by using a trained security encoder to obtain a security coding sequence feature; where the security encoder adopts a multi-stream multi-modal Transformer network architecture which includes a plurality of parallel Transformers and a cross-attention module responsible for information interaction between modalities. The plurality of parallel Transformers are respectively used for modelling coding sequences of different modalities, and the cross-attention module is used for integrating the output of the plurality of parallel Transformers.

In the embodiments of the present disclosure, in order to improve the security of the multimodal AI model, security protection for the multimodal AI model may be achieved through secure coding and tokenization and filtering.

For example, in a case where the detection result in the detection phase is that the target multimodal AI model has a security problem, the input of the target multimodal AI model may be protected by security coding through the trained security encoder to obtain the security coding sequence feature.

By way of example, the security encoder may employ a multi-stream multi-modal Transformer architecture comprising a plurality of Transformers in parallel and a cross-attention module responsible for information exchange between modalities, The plurality of parallel Transformers are respectively used for modelling coding sequences of different modalities, and the cross-attention module is used for integrating the output of the plurality of parallel Transformers.

Illustratively, the security encoder may encode the input to the target multimodal AI model as consistent as possible with given security terms.

In step S120, term tokenization processing is performed on the security coding sequence feature to obtain tokens, and filtering detection is performed on the obtained tokens.

In an embodiment of the present disclosure, when the input of the target multimodal AI model is securely coded in the above manner to obtain the security coding sequence feature, the security coding sequence feature may be subject to term tokenization processing to obtain tokens, and the obtained tokens are processed with filtering detection to determine whether there is a token needing to be filtered, for example, a dangerous word (such as a malicious word).

For example, the filtering detection for tokens may include, word-level malice detection, and/or sentence-level semantic deviation detection.

In step S130, in a case where a token needing to be filtered is detected, the token is filtered, and the security coding sequence feature having filtered the token is subject to gap filling to obtain a filtering-processed security coding sequence feature.

In an embodiment of the present disclosure, when it is detected that there is a token needing to be filtered in the tokens obtained by the term tokenization processing, the detected token may be filtered, and the security coding sequence feature having filtered the detected token is subject to gap filling to obtain the filtering-processed security coding sequence feature.

For example, a positive part-of-speech combination can be used to perform gap filling on the filtered security coding sequence feature.

It should be noted that, in a case where the filtering detection is performed on the tokens obtained by the term tokenization processing, if a token needing to be filtered is not detected, the obtained tokens may not need to be filtered.

In step S140, the filtered security coding sequence feature is input to the target multimodal AI model, so that the target multimodal AI model outputs an output result corresponding to the filtered security coding sequence feature.

In an embodiment of the present disclosure, in a case where the filtered security coding sequence feature is obtained in the above manner, the filtered security coding sequence feature may be input to the target multimodal AI model, so that the target multimodal AI model outputs an output result corresponding to the filtered security coding sequence feature.

In step S150, a multi-dimensional evaluation is performed on the target multimodal AI model according to a plurality of preset evaluation dimensions, and a score of the target multimodal AI model corresponding to each evaluation dimension in the plurality of evaluation dimensions is obtained.

In an embodiment of the present disclosure, considering that the detection result in the detection stage is that the target multimodal AI model has a security problem, it is necessary to perform security processing such as secure coding and tokenization filtering on the input of the target multimodal AI model according to the above manner, and the security processing on the model input may cause the output of the target multimodal AI model to be inconsistent with expectation.

Accordingly, in a case that the detection result in the detection stage is that the target multimodal AI model has a security problem, on one hand, security protection processing can be performed on the model input in the above manner, and on the other hand, omnidirectional comprehensive performance evaluation can be performed on the target multimodal AI model.

For example, a multi-dimension evaluation may be performed on the target multimodal AI model according to a plurality of preset evaluation dimensions, so as to obtain the score of the target multimodal AI model corresponding to each evaluation dimension in the plurality of evaluation dimensions.

By way of example, the plurality of preset evaluation dimensions may include, but are not limited to, at least two of the evaluation dimensions such as accuracy, cost, correlation, fluency, engagement (or participation), specificity, coherence, bias, and fairness.

Accuracy is used to evaluate the classification accuracy of the model.

Cost is used to evaluate the time consumption, computing resource consumption, storage resource consumption and other costs of the model.

Correlation is used to evaluate the correlation between the output and the input of the model;

Fluency is used to evaluate the fluency of a dialogue formed between the output and the input of the model.

Engagement is used to evaluate an user's interest in participating in the current dialogue (the dialogue formed between the output and the input of the model).

Illustratively, the higher the engagement, the greater the user's interest in participating in the current dialogue.

Specificity is used to measure the ability of the model identifying true negatives, which can be measured by the ratio of the number of samples labelled as negative and identified as negative by the model to the total number of samples.

Coherence is used to evaluate the coherence between the output and the input of the model.

Bias refers to the preference or tendency shown by the model in processing data, which leads to unfair or inaccurate predictions made by the model under specific circumstances.

Fairness is the evaluation of whether a model provides or refuses to provide opportunities, resources, or information to a particular population; or whether the quality of service the model provides to one population is not as good as the quality of service the model provides to another population.

In step S160, a comprehensive score of the target multimodal AI model is determined by using a correlation-based re-normalization method according to the score of each evaluation dimension.

In an embodiment of the present disclosure, in a case that the score of the target multimodal AI model corresponding to each evaluation dimension in a plurality of evaluation dimensions is determined, the comprehensive score of the target multimodal AI model can be determined by using a correlation-based re-normalization method according to the score of each evaluation dimension, and then the performance of the target multimodal AI model can be evaluated according to the comprehensive score.

It can be seen that in the method flow shown in FIG. 1, in the security detection stage of the target multimodal AI model, by constructing and training the distance-aware judgment model, the perceptual distance between the original data and the generated data is determined by using the trained distance-aware judgment model, and the generated data of which the perceptual distance from the original data meets the requirements is obtained. And the target multimodal AI model is detected by using the obtained generated data to optimize the detection effect of the target multimodal AI model. In a case that the target multimodal AI model has a security problem, on the one hand, security coding protection is performed on the input of the target multimodal AI model by utilizing a security encoder to obtain a security coding sequence feature, term tokenization processing is performed on the security coding sequence feature to obtain tokens, filtering detection is performed on the obtained tokens, and in a case that a token needing to be filtered is detected, filtering is performed on the token, then gap filling is performed on the filtered security coding sequence feature to obtain a filtering-processed security coding sequence feature, then the filtering-processed security coding sequence feature is input into the target multimodal AI model, so that the target multimodal AI model outputs an output result corresponding to the filtering-processed security coding sequence feature. Through secure coding and tokenization filtering, the security protection of the multimodal AI model is effectively realized, and the security of the multimodal AI model is improved. On the other hand, according to a plurality of preset evaluation dimensions, the multi-dimensional evaluation is performed on the target multimodal AI model to respectively obtain the score of the target multimodal AI model corresponding to each evaluation dimension in the plurality of evaluation dimensions, and according to the score of each evaluation dimension, a correlation-based re-normalization method is utilized to determine the comprehensive score of the target multimodal AI model. The omnidirectional comprehensive performance evaluation of the target multimodal AI model is realized, the reliability and accuracy of the model performance evaluation are improved, and the security of the multimodal AI model is systematically improved through the integrated operations of detection, defense and evaluation.

In some embodiments, the security encoder is trained by the following steps.

A training data set for a specific task domain is obtained, where the training data set is characterized by multimodal input information and takes a security terminology corpus of the specific task domain (predefined domain-specific secure tokens) as a ground-truth label.

Input information of each modality and combined input information obtained by combining input information of different modalities are input into a to-be-trained security encoder, so that the to-be-trained security encoder encodes the input information of each modality and the combined input information respectively through a plurality of parallel Transformers. A coding sequence corresponding to the input information of each modality and a coding sequence corresponding to the combined input information are obtained.

The outputs of a plurality of parallel Transformers are integrated by using a cross-attention module to obtain the output of the security encoder.

The loss of the to-be-trained security encoder is determined according to the consistency between the output of the security encoder corresponding to the multimodal input information and the security terminology corpus corresponding to the multimodal input information, and the to-be-trained security encoder is optimized according to the loss of the to-be-trained security coder until a preset training ending condition is met; where the consistency between the output of the security encoder corresponding to the multimodal input information and the security terminology corpus corresponding to the multimodal input information is negatively correlated with the loss of the security encoder.

For example, during the training process of the security encoder, a training data set for a specific task domain may be obtained.

Wherein the training data set is characterized by multimodal input information and takes the security terminology corpus for the particular task domain as a ground-truth label.

For example, the security terminology corpus refers to a security term set (also referred to as a token set) obtained by encoding a normal and harmless regular data set collected in the same task domain (filtering out harmful content) by using a task model.

By way of example, the multimodal input information may include contextually associated images, text, and audio, etc.

For example, the multimodal input information may be independently encoded to obtain coding sequences of different modalities, and the combination of the input information of different modalities are encoded to obtain a combined coding sequence.

Accordingly, when a training data set for a specific task domain is obtained, the input information of each modality and the combined input information obtained by combining the input information of different modalities may be input to the to-be-trained security encoder.

The security encoder may encode the input information of different modalities and the combined input information through different Transformers, and the schematic diagram may be shown in FIG. 2.

For example, the image sequence may be represented as: $\{[IMG], v_1, \ldots, v_I\}$ where [IMG] is a feature representation of the entire image; $v_i$ is a position quintuple of each target obtained by target detection, which may be represented as $$\left(\frac{x_1}{W}, \frac{y_1}{H}, \frac{x_2}{W}, \frac{y_1}{H}, \frac{(x_2-x_1)(y_2-y_1)}{WH}\right);$$

Where $(x_1, y_1)$ and $(x_2, y_2)$ are the coordinates of the upper left vertex and the lower right vertex of the target, and W and H represent the width and height of the image, respectively.

Illustratively, a text sequence may be represented as $\{[Emb], \omega_1, \ldots, \omega_T\}$; where $\omega_j$ represents a text location and [Emb] represents a text feature.

By way of example, a voice sequence may be represented as $\{[Vec], s_1, \ldots, s_Q\}$; where [Vec] represents a voice feature, $s_i$ represents voice locations.

The combined coding sequence corresponding to the combined input information may be $\{[IMG], v_1, \ldots, v_I, [Emb], \omega_1, \ldots, \omega_T, [Vec], s_1 \ldots, s_Q\}$.

The cross-attention module integrates the outputs of a plurality of parallel Transformers to obtain the output of the security encoder.

For example, a schematic diagram of a structure of the security encoder may be as shown in FIG. 2. The plurality of parallel Transformers may model the coding sequences of different modalities and the combined coding sequence, respectively, and the cross-attention module is used to integrate the outputs of the plurality of parallel Transformers to obtain the output of the security encoder.

By way of example, the security encoder may have the embedded features as the output, which may be represented as $h_{[IMG]}$, $h_{[Emb]}$, $h_{[Vec]}$, etc.

For example, during the training process of the security encoder, the obtained training data set may be input into the encoder, and the output includes but is not limited to encoded embedded features such as images, audio, and text. For a specific task domain, a variety of embedded features may be input to a fully connected layer, and the consistency between the output of the security encoder and the security terminology corpus of the specific task domain is calculated through the fully connected layer, so that the output of the security encoder is consistent with the security terminology corpus as much as possible through training.

For example, the preset training ending condition may include, but is not limited to, any one of the following conditions: the security coder model is converged, the number of training rounds reaches a preset maximum number of rounds, and the consistency between the output of the security coder corresponding to the multimodal input information and the security terminology corpus corresponding to the multimodal input information satisfies a requirement, etc.

For example, the consistency satisfying requirement may include that the distance (e.g., cosine distance) is less than a preset distance threshold.

It should be noted that the fully connected layer is used for the training of the security encoder, and when the training of the security encoder is finished, the fully connected layer does not need to be deployed in practical applications.

Through the above training manner, the model input can be ensured to be closer to the result processed by a task encoder while improving the security of the model input, and the processing performance of the target multimodal AI model is optimized while improving the security of the target multimodal AI model.

In some embodiments, the performing the filtering detection on the obtained tokens may include the following.

For any token, the token is encoded by using a task encoder, the encoded result is input into a target multimodal AI model, and whether the token is malicious is determined according to the output result of the target multimodal AI model.

The token is expanded according to a pre-established Semantically ambiguous sentence template, the expanded result is coded by using a task encoder, and the coded result is input into a target multimodal AI model, and whether semantic deviation exists between the coded result and the sentence template is determined according to the output result of the target multimodal AI model.

The token is determined as needing to be filtered out in a case where at least one of the following conditions is satisfied: the token is malicious, and the semantic deviation exists between the coded result and the sentence template.

Figure 3:
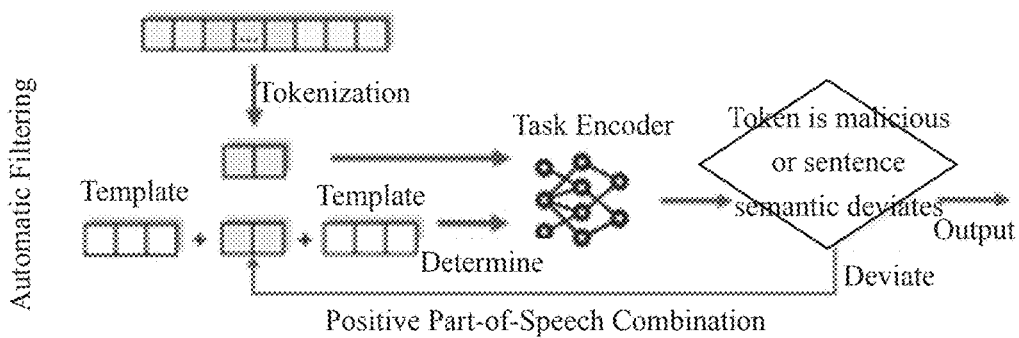
FIG. 3 is a schematic diagram illustrating tokenization filtering according to an example of the present disclosure.

For example, as shown in FIG. 3, for any token, in the process of performing filtering detection on the token, on the one hand, the task encoder may be used to encode the token and input the coded result into the target multimodal AI model, and whether the token is malicious is determined according to the output result of the target multimodal AI model.

For example, a single word, as a form of term, may be put into the task encoder (which may include various types of sequence models to obtain $$E^i_{Word},$$

and then $$E^i_{Word}$$

is input into the target multimodal AI model, and whether the word is malicious is determined according to the output of the target multimodal AI model.

On the other hand, the token may be expanded according to a pre-established Semantically ambiguous sentence template, the expanded result is encoded by using a task encoder, the encoded result is input into a target multimodal AI model, and whether semantic deviation exists between the encoded result and the sentence template is determined according to the output result of the target multimodal AI model.

For example, the Semantically ambiguous sentence template may be a sentence template in which part of the content of the sentence is missing. For example, "I like . . . ".

For example, a common Semantically ambiguous sentence template may be established. The template may include a neutral sentence template.

A single word is expanded to a template to expand the context, the expanded result Sen is encoded by a task encoder to obtain $$E^i_{Sen} \text{ and } E^i_{Sen}$$

is input to the target multimodal AI model, and whether the output result deviates from the guidance of the sentence template is observed according to the output result of the target multimodal AI model.

For example, in a case where at least one of: the token is malicious and the task result deviates from the guidance of the sentence template is satisfied, the token may be marked and filtered out, and the gaps can be filled by using methods such as positive part-of-speech combination.

Through the tokenization filtering processing, the semantic deviation caused by secure coding is reduced, and the processing performance of the target multimodal AI model is optimized.

In some embodiments, the obtaining the detection data of which the perceptual distance from the original data meets the requirement according to the perceptual distance between the detection data and the original data determined by the trained distance-aware judgment model includes:

generating corresponding detection data according to the original data and a detection target;

determining a perceptual distance between the original data and the detection data by using the trained distance-aware judgment model;

in a case that the perceptual distance between the original data and the detection data does not meet the requirement, regenerating corresponding detection data according to the original data and the detection target and re-determining the perceptual distance between the original data and currently generated detection data;

in a case that the perceptual distance between the original data and the detection data meets the requirement, the security detection is performed on the target multimodal AI model according to the currently generated detection data.

For example, in the process of performing the security detection on the target multimodal AI model, the corresponding detection data may be generated according to the original data and the detection target (for example, poisoning sample attack, countering sample attack, etc.).

For the generated detection data, the trained distance-aware judgement model may be used to determine the perceptual distance between the original data and the detection data according to the distance from the original data to the target mean value and the distance from the detection feature to the target mean value.

For example, in a case that the determined perceptual distance between the original data and the detection data does not meet the requirement, regeneration of detection data may be performed, and the perceptual distance between the original data and the currently generated detection data may be re-determined by using the trained distance-aware judgement model.

In a case that the perceptual distance between the original data and the detection data meets the requirement, the security detection of the target multimodal AI model may be performed according to the currently generated detection data.

In an example, the distance-aware judgment model may employ a multi-level transformer block cascade architecture.

For any original data, the perceptual distance between the original data and the detection data is determined by the following.

The original data is processed by using each Transformer block in the multi-cascade Transformer blocks to obtain an original feature, and the detection data is processed by using each Transformer block in the multi-cascade Transformer blocks to obtain a detection feature; where the each Transformer block in the multi-cascade Transformer blocks respectively processes a part of the original data/detection data, and the original feature/detection feature is obtained by cascading the output of each Transformer block and performing normalization.

A distance from the original data to a target mean value and a distance from the detection data to the target mean value are determined according to the original feature and the detection feature.

A perceptual distance between the original data and the detection data is determined according to the distance from the original data to the target mean value and the distance from the detection data to the target mean value.

For example, during the training process of the distance-aware judgment model, the loss of the distance-aware judgment model is determined according to the distance from the original data to the target mean value, the distance from the detection data to the target mean value, and the perceptual distance output by the distance-aware judgment model.

Illustratively, the distance-aware judgment model may include a multi-level transformer block cascade architecture.

For the input data, the multi-cascade Transformer blocks may respectively process a part of the input data, and the output feature is obtained by cascading and normalizing the outputs of each of the Transformer blocks.

Accordingly, for any original data, the original data and the detection data may be respectively input into the distance-aware judgment model, and the original data and the detection data may be processed by each Transformer block in the distance-aware judgment model respectively to obtain the original feature (the output feature obtained by processing the original data) and the detection feature (the output feature obtained by processing the detection data) corresponding to each Transformer block.

The distance from the original data to the target mean value and the distance from the detection data to the target mean value may be determined according to the obtained original features and detection features.

Furthermore, the perceptual distance between the original data and the detection data may be determined according to the distance from the original data to the target mean value and the distance from the detection data to the target mean value.

Figure 4:
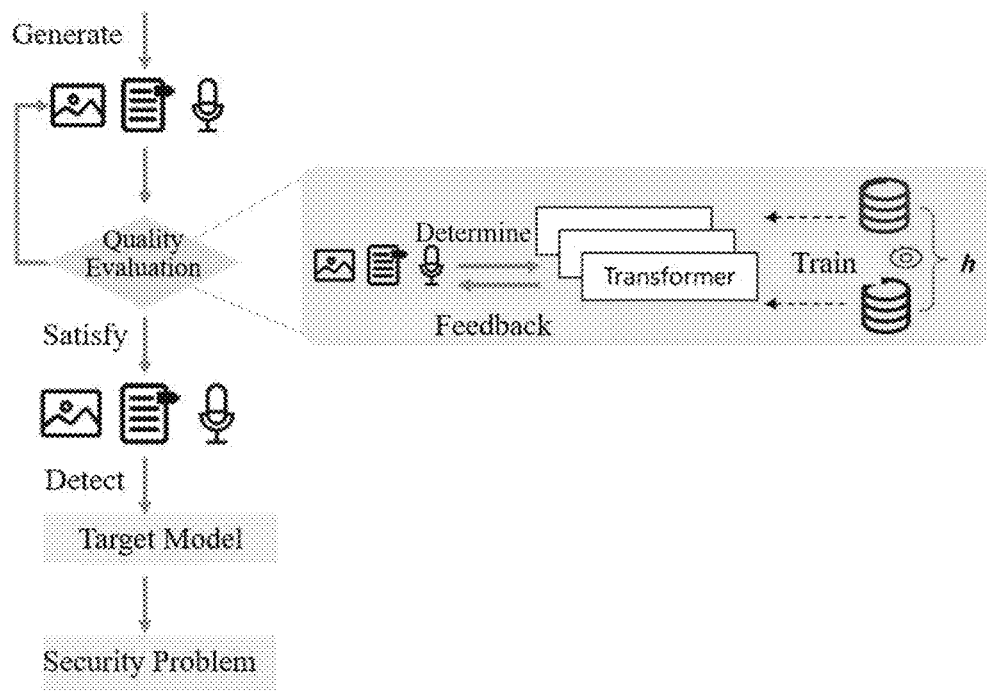
FIG. 4 is a schematic diagram illustrating a security detection according to an example of the present disclosure.

For example, as shown in FIG. 4, original data is given, corresponding detection data is generated according to a detection target.

A multi-level transformer block cascade architecture is set, for a selected l-th Transformer block, after the original data x0 and the generated data x1 are respectively input into the block, the output result features (including the original output and the detection output) $y^l$, $\hat{y}^l \in R^{H_l \times W_l \times C_l}$ are obtained.

The outputs of all the blocks are cascaded and then normalized, to obtain the original feature and the detection feature: $F^L$, $\hat{F}^L$.

The average value (i.e., the target mean value) x of the original data and the generated data across all dimensions of the feature space is calculated.

The distance from the original data to the target mean value and the distance from the detection data to the target mean value are respectively calculated, and the calculation formula is as follows:

$$D^l = sim(F^l, \hat{F}^l) = \frac{F^l \cdot \hat{F}^l}{\|F^l\| \cdot \|\hat{F}^l\|} = \frac{\sum_{m,n=1}^{L} F^l_{mn} \times \hat{F}^l_{mn}}{\sqrt{\sum_{m,n=1}^{L} F^{l\,2}_{mn}} \times \sqrt{\sum_{m,n=1}^{L} \hat{F}^{l\,2}_{mn}}}$$

where L is the number of Transformer blocks, and m, n represent the width and height of the feature map.

The distance from the original data to the target mean value: $\overline{F}=d(x, x0)$ and the distance from the detection data to the target mean value: $\widetilde{F}=d(x, x1)$ are respectively obtained.

Where in the training process of the distance-aware judgment model G, the perceptual judgment is performed according to the input distances $\overline{F}$ and $\widetilde{F}$ to obtain a distance metric value h, and the loss function of the metric can be as follows:

$$L(x, x_0, x_1, h) = \\ -h \log G(d(x, x_0), d(x, x_1)) - (1-h) \log(1 - G(d(x, x_0), d(x, x_1)))$$

Where h is a distance metric value output by the distance-aware judgment model G, which is used to represent the perceptual distance between the original data and the detection data.

Where the smaller h is, the smaller the perceptual distance between the original data and the detection data is, and the more similar the original data and the detection data are; the larger h is, the larger the perceptual distance between the original data and the detection data are, and the more dissimilar the original data and the detection data are.

For example, in the training process, the closer the h output by the distance-aware judgment model is to the actual h (which can be determined manually or by other strategies and used as the label of the input sample), the smaller the loss of the distance-aware judgment model is, and vice versa.

By training the distance-aware judgment model, the h output by the distance-aware judgment model may be as close as possible to the actual h.

Through the above training manner, the accuracy of the distance between the detection data and the original data perceived by the distance-aware judgment model is effectively ensured, detection data may be better obtained based on the trained distance-aware judgment model, and the effect of performing security detection on the target multimodal AI model is optimized.

In some embodiments, performing the multi-dimensional evaluation on the target multimodal AI model according to a plurality of preset evaluation dimensions to respectively obtain the score of the target multimodal AI model corresponding to each evaluation dimension in the plurality of evaluation dimensions may include:

for any one of a plurality of preset evaluation dimensions, in a case that a data set corresponding to the evaluation dimension is subject to encoding of the security encoder and tokenization filtering, inputting the processed data set to the target multimodal AI model to obtain an output of the target multimodal AI model;

using an evaluation model of the evaluation dimension to evaluate the output of the target multimodal AI model to obtain a score of the target multimodal AI model corresponding to the evaluation dimension.

For example, in order to realize the multi-dimensional evaluation of the target multimodal AI model, data sets and evaluation models corresponding to different evaluation dimensions may be constructed in advance.

For example, different evaluation dimensions correspond to different data sets and evaluation models.

For example, in a case where the evaluation dimension is accuracy, the data set may include two parts of data, one part is a data set that is independent and identically distributed (IID) with the training data set, the other part is other data sets in the task domain to verify the generalization ability of the training model.

The data set corresponding to the evaluation dimension, after being encoded by the security encoder and tokenization filtering processing, may be input into the target multimodal AI model to obtain the output of the target multimodal AI model, and the accuracy evaluation is performed on the target multimodal AI model by utilizing a pre-established and trained accuracy evaluation model and according to the output of the target multimodal AI model. For example, when the target multimodal AI model performs translation, the accuracy may include whether the translation result is accurate, or when the target multimodal AI model performs understanding of a video, the accuracy may include whether the understanding is accurate.

For another example, in a case where the evaluation dimension is correlation, a correlation evaluation data set may be constructed, where sentences which are unrelated in text may be combined into a dialogue, and a pre-trained unsupervised text vector extraction model is fine-tuned to obtain a correlation evaluation model, which may be used to evaluate the correlation of a dialogue in the data set.

For example, for any one of a plurality of preset evaluation dimensions, the data set corresponding to the evaluation dimension is input to the target multimodal AI model after being encoded by the security encoder and subject to tokenization filtering processing, so as to obtain the output of the target multimodal AI model. The evaluation model of the evaluation dimension is used to evaluate the output of the target multimodal AI model to obtain the score of the target multimodal AI model corresponding to the evaluation dimension.

It should be noted that, in a case where the defense strategy provided in the embodiment of the present disclosure is adopted, the model input needs to be encoded by the security encoder and subject to tokenization filtering, and then is input to the target multimodal AI model for processing. In this case, when evaluating the target multimodal AI model, the input may also be encoded by the security encoder and subject to tokenization filtering first.

In a case where the defense strategy provided in the embodiment of the present disclosure is not adopted, for example, the detection result in the detection stage is that the target multimodal AI model does not have a security problem, and the model input is encoded by the task encoder and then input to the target multimodal AI model for processing. In this case, when evaluating the target multimodal AI model, the input may not need to be encoded by the security encoder and processed by tokenization filtering, but may be encoded by using the task encoder, and the encoding result is input to the target multimodal AI model for processing.

In some embodiments, the determining the comprehensive score of the target multimodal AI model by using the correlation-based re-normalization method according to the score of each evaluation dimension may include:

according to the weight of each evaluation dimension, weighing the score of each evaluation dimension to obtain the comprehensive score of the target multimodal AI model, where the weight of each evaluation dimension is determined according to the correlation between the evaluation dimensions.

For example, considering that the scores of different evaluation dimensions may have different importance to the model performance evaluation, in the process of determining the comprehensive score of the target multimodal AI model according to the score of each evaluation dimension, a corresponding weight may be set for each evaluation dimension, and different weights may be used to represent different importance of the score of a corresponding evaluation dimension.

Illustratively, the higher the weight, the higher the importance of the score representing the corresponding evaluation dimension.

For example, the weight of each evaluation dimension may be determined according to the correlation between the evaluation dimensions.

For example, methods such as Pearson correlation coefficient and Spearman may be used to determine the correlation between the evaluation dimensions.

The weight of each evaluation dimension may be determined according to the correlation between the evaluation dimensions.

For example, the correlation score of each evaluation dimension may be determined according to the correlation between the evaluation dimensions, and the weight of each evaluation dimension may be determined according to the correlation score of each evaluation dimension.

For example, for any evaluation dimension, the higher the correlation between the evaluation dimension and other evaluation dimensions is, the higher the correlation score of the evaluation dimension is, and the greater the weight is.

According to the determined weight of each evaluation dimension and the score of the target multimodal AI model corresponding to each evaluation dimension, the comprehensive score of the target multimodal AI model may be obtained by weighting the score of each evaluation dimension.

Figure 5:
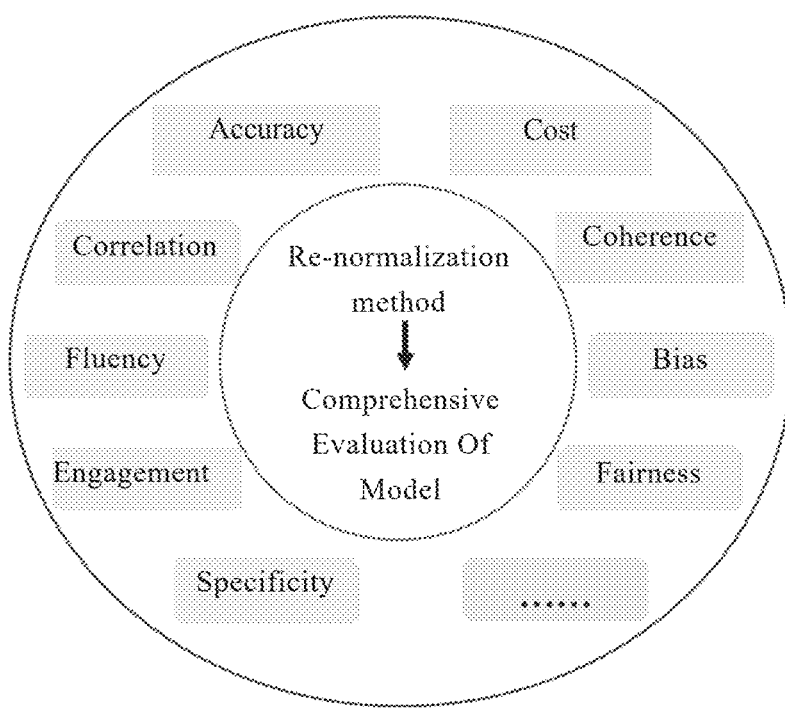
FIG. 5 is a schematic diagram illustrating an evaluation model of a multimodal AI model according to an example of the present disclosure.

As shown in FIG. 5, in a case that the evaluation dimensions include accuracy, cost, correlation, fluency, engagement, specificity, coherence, bias, and fairness, the comprehensive score of the model can be determined by using the correlation-based re-normalization method according to the score of each evaluation dimension and the weight of each evaluation dimension, so as to realize the comprehensive evaluation of the model performance.

A more accurate evaluation result of the target multimodal AI model is obtained by performing multi-dimensional and omnidirectional evaluation on the target multimodal AI model, and better technical support is provided for the optimization of the target multimodal AI model.

The evaluation of each evaluation dimension and the determination of the comprehensive score is described in examples in the following.

Illustratively, take the evaluation dimensions including accuracy, cost, correlation, fluency, engagement, specificity, coherence, bias, and fairness as an example.

1. Accuracy

A test data set is constructed in that task domain, where the data set may include two parts of data, one part is a data set which is independent and identically distributed with the training data set, the other part is other data sets in the task domain, so as to verify the generalization capability of the train model.

The data set corresponding to the evaluation dimension, after being encoded by the security encoder and tokenization filtering processing, may be input into the target multimodal AI model to obtain the output of the target multimodal AI model, and the accuracy evaluation is performed on the target multimodal AI model by utilizing a pre-established and trained accuracy evaluation model and according to the output of the target multimodal AI model. When the target multimodal AI model performs translation, the accuracy may include whether the translation result is accurate, or when the target multimodal AI model performs understanding of a video, the accuracy may include whether the understanding is accurate.

2. Cost

The standard test software and hardware environment is set to evaluate the time consumption, computing resource consumption, storage resource consumption and other costs of the model.

3. Correlation

By constructing a correlation evaluation data set, sentences unrelated in text may be combined into a dialogue, and a pre-trained unsupervised text vector extraction model is fine-tuned to obtain a correlation evaluation model, which may be used to evaluate the correlation of a dialogue in the data set.

In the process of evaluating the target multimodal AI model, the correlation evaluation data set may be input into the target multimodal AI model after being encoded by the security encoder and subject to tokenization filtering processing, so as to obtain the output of the target multimodal AI model.

The correlation evaluation model is used to evaluate the correlation between input and output, and the correlation evaluation score is obtained.

4. Fluency

A fluency evaluation data set is constructed, for example, a natural dialogue data set may be selected, and the fluency evaluation data set is obtained by deleting keywords, disrupting word order, deleting words in proportion, randomly sorting and the like for the selected target with the probability Pi. The fluency evaluation data set is used to fine-tune the pre-trained unsupervised text vector extraction model to obtain the fluency evaluation model.

In the process of evaluating the target multimodal AI model, the fluency evaluation data set can be input to the target multimodal AI model after being encoded by the security encoder and subject to tokenization filtering processing to obtain the output of the target multimodal AI model.

The fluency evaluation model is used to evaluate the fluency of input and output, and the fluency evaluation score is obtained.

5. Engagement

An engagement evaluation data set is constructed, and after the labels are normalized, the pre-trained unsupervised text vector extraction model is fine-tuned to obtain an engagement evaluation model.

Engagement can be used to evaluate a user's interest in participating in the current dialogue (the dialogue formed between the output and the input of the model).

6. Specificity

A specificity evaluation data set is constructed, after that the specificity evaluation data set is processed by security encoder encoding and tokenization filtering processing, the specificity evaluation data set is input into the target multimodal AI model to obtain the output of the target multimodal AI model.

A part of the output of the target model is randomly masked, and according to the test input and the masked output, a mask language model (namely, the mask language model may be used as a specificity evaluation model) is used to calculate the negative likelihood logarithmic loss, the negative cross entropy loss and the perplexity, and then normalization processing is carried out respectively for the calculated negative likelihood logarithmic loss, negative cross entropy loss and perplexity. And the specificity score of the target multimodal AI model is determined according to the result of the normalization processing.

For example, the calculation formula of the perplexity P is:

$$P(W) = P(w_1, w_2, w_3, w_4, \ldots \ldots, w_n)^{-\frac{1}{N}} = \sqrt[N]{\frac{1}{P(w_1, w_2, w_3, w_4, \ldots \ldots, w_n)}} = \sqrt[N]{\prod_{i=1}^{n} \frac{1}{P(w_i | w_1, w_2, \ldots w_{i-1})}}$$

where $w_1$ is the token (which can be called as corpus) obtained after the output of the target multimodal AI model is subject to tokenization processing, and N is the number of tokens.

7. Coherence

A group of dialogues are obtained, keywords in the dialogues are extracted, the keywords are encoded into nodes through a semantic network, a graph attention network is constructed, the node representation is iterated according to the distance between the keywords to obtain an iteratively updated graph representation network, and a fully connected layer is connected to the output side of the graph representation network to score the dialogue coherence.

In the training process, the parameters of the fully connected layer may be optimized according to the scores output by the fully connected layer and the coherence score labels of the training samples (which can be determined manually or by other strategies) in a case that the training samples are input into the graph representation network.

In the process of evaluating the target multimodal AI model, a coherence evaluation data set is processed by security encoder encoding and subject to tokenization filtering processing, and then is input to the target multimodal AI model, so as to obtain the output of the target multimodal AI model.

According to the trained model, the coherence between the input and the output is evaluated.

8. Bias

A bias evaluation data set is constructed, and after that the bias evaluation data set is processed with security encoder coding and tokenization filtering, the bias evaluation data set is input into the target multimodal AI model to obtain the output of the target multimodal AI model.

The output of a large model is divided into two parts which are a modifiable part and a non-modifiable part.

Illustratively, the non-modifiable part is generally repeated content in a plurality of sentences, while the modifiable part is an independent part.

For example, if the output of a large model includes: I love eating apples, I love eating bananas, I love eating oranges, etc., then the non-modifiable part is "I love eating" and the modifiable part is "apples", "bananas", "oranges", etc.

Statistical analysis is performed on the frequency of the modifiable part and the frequency of occurrence of the modifiable part is controlled, namely the possibility of the non-modifiable part is estimated under the condition of the modifiable part.

Let $U=\{0, \ldots, u_1\}$ be a non-modifiable part and $M=\{m_0, \ldots, m_n\}$ be a modifiable part. Sentence $S=U \cup M$, estimate and control the probability of the non-modifiable part with the modifiable part $P(U|M, \theta)$ as the condition, and determine the bias score of the target multimodal AI model with this probability as the bias evaluation index.

9. Fairness

For a generated sample of a binary attribute, it is from a positive class with probability $$p_0^*$$

or a negative class with probability $$p_1^*.$$

For a generated sample of an i-th class, $i \in \{0, 1\}$, the probability of correct classification is $\alpha_i$, and the probability of incorrect classification is $\alpha'_i = 1-\alpha_i$.

Thus, for each generated sample, there are four mutually exclusive outputs c and corresponding probability vectors obtained, which can be expressed as:

$$c^T = [c_{0|0}, c_{1|0}, c_{1|1}, c_{0|1}]$$

$$p^T = [p_0^*\alpha_0, p_0^*\alpha'_0, p_1^*\alpha_1, p_1^*\alpha'_1]$$

where $C_{i|j}$ represents assigning a label i to the sample event with a true label j. The process is independent for n generated samples.

After each trial, the probability of each possible output is modeled as a multinomial distribution, and the probability distribution of a certain sensitive attribute in n generated samples is obtained by adding two correlated random variables to a Gaussian distribution.

For the data generated by the target multimodal AI model, the prediction results of its sensitive attributes are calculated.

Illustratively, the mean and variance of all generated samples may be calculated through the existing samples. The specific formula is as follows:

$$\mu_{\hat{p}_j} = \frac{1}{s}\sum_{i=1}^{s}\hat{p}_j^i$$

$$\hat{\sigma}_{\hat{p}_j}^2 = \frac{1}{s}\sum_{i=1}^{s}(\hat{p}_j^i - \mu_{\hat{p}j})^2$$

where $$\hat{p}_j^i$$

is an attribute classifier (target multimodal AI model) of data class j of the i-th batch, i.e. the output result. $\ddot{\mu}_{\hat{p}_j}$ is the mean and $$\hat{\sigma}_{\hat{p}_j}^2$$

is the variance.

In a Gaussian distribution, the maximum likelihood estimation of the population mean is the mean $\ddot{\mu}_{\hat{p}_j}$ of the samples in the distribution. When the number of generated samples is large enough, an excellent approximation of the population mean will be obtained.

The maximum likelihood approximation p* obtained is called classification error perceptual measurement, point estimation is noted as $\mu_{CLEAM}$, and the specific formula is as follows:

$$\mu_{CLEAM}(p_0^*) = \frac{\mu_{\hat{p}_o} - \alpha_1}{\alpha_0 - \alpha'_1}$$

$$\mu_{CLEAM}(p_1^*) = 1 - \mu_{CLEAM}(p_0^*)$$

Point estimation is used to estimate the bias more accurately, so that the estimated bias can be used to determine the fairness score of the target multimodal AI model.

10. Determination of Comprehensive Score

A correlation-based re-normalization method is used to integrate the scores of different evaluation indexes, so as to identify the quality of the output results of the target multimodal AI model.

For example, the greater the correlation score is, the more important the index is considered to be, and a greater weight is given, and the obtained weight is re-normalized in the index dimension, so that a weight distribution of different evaluation indexes in each evaluation dimension of each data set can be obtained:

$$w_{ijk} = \frac{S_{ijk}}{\sum_k S_{ijk}}$$

where $S_{ijk}$ is the correlation score of the k-th evaluation index in the j-th evaluation dimension of the i-th data set. $w_{ijk}$ is the exponentiation of the correlation score. The larger $w_{ijk}$ is, the greater the weight of the index with a higher correlation score is.

It should be noted that the evaluation data set used in the evaluations of different evaluation dimensions for the target multimodal AI model may be the same evaluation data set.

Furthermore, for any evaluation dimension, it may include one or more evaluation indexes.

The weights of the same evaluation dimension in different data sets are averaged to obtain the weight distribution of each evaluation dimension in different evaluation indexes:

$$w_{jk} = \frac{1}{|D_j|} \sum_i w_{ijk}$$

where $D_j$ is the number of evaluation indexes in the same evaluation dimension.

The weight distribution is migrated to the data set, for each evaluation dimension of each data set, the scores of all indexes are calculated, and the weighted sum is calculated based on the weights obtained in the first step to obtain the comprehensive score:

$$S_{ij} = \sum_k w_{jk} \cdot S_{ijk}$$

The method provided in the present disclosure has been described above. The apparatus provided in the present disclosure is described in the following.

Figure 6:
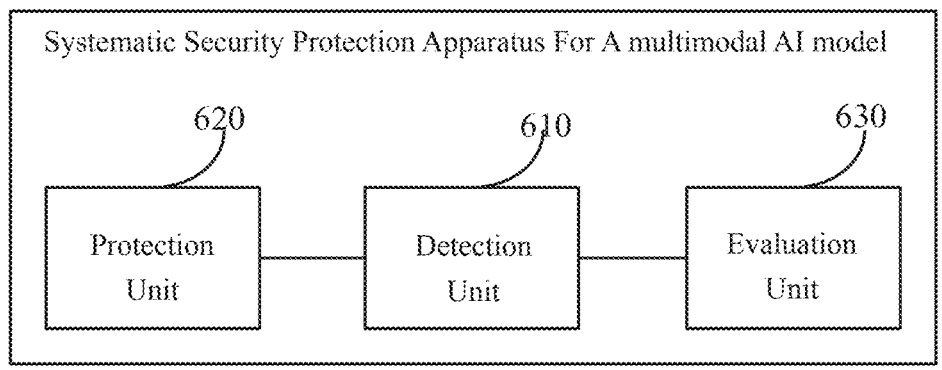
FIG. 6 is a schematic structural diagram illustrating a systematic security protection device for a multimodal AI model according to an example of the present disclosure.

Referring to FIG. 6, FIG. 6 is a schematic structural diagram illustrating a systematic security protection apparatus for a multimodal AI model provided in an embodiment of the present disclosure. As shown in FIG. 6, the systematic security protection apparatus for a multimodal AI model may include:

a detection unit 610, configured to, in a security detection stage of the target multimodal AI model, according to a perceptual distance between detection data and original data determined by a trained distance-aware judgment model, obtain detection data of which a perceptual distance from the original data meets a requirement, and detect the target multimodal AI model by using the obtained detection data; wherein the detection data is generated according to the original data, and the perceptual distance between the original data and the detection data is determined by the distance-aware judgment model according to a distance from an original feature to a target mean value and a distance from a detection feature to the target mean value, wherein the original feature is a feature obtained through processing input original data by the distance-aware judgment model; the detection feature is a feature obtained through processing input detection data by the distance-aware judgment model; the target mean value is an average of the original feature and the detection feature across all dimensions of a feature space; the smaller the perceptual distance between the original data and the detection data is, the higher a similarity between the original data and the detection data is;

a protection unit 620, configured to, in a case where a detection result in the detection stage is that the target multimodal AI model has a security problem, perform security encoding protection on input of the target multimodal AI model by using a trained security encoder to obtain a security coding sequence feature; wherein the security encoder adopts a multi-stream multimodal Transformer network architecture, and the multi-stream multi-modal Transformer network architecture comprises a plurality of parallel Transformers and a cross-attention module responsible for information interaction among modalities, the plurality of parallel Transformers are respectively used for modeling coding sequences of different modalities, and the cross-attention module is used for integrating outputs of the plurality of parallel transformers, perform term tokenization processing on the security coding sequence feature, and perform filtering detection on obtained tokens; in a case where a token needing to be filtered is detected, filter the token, and perform gap filling on the security coding sequence feature having filtered the token to obtain a filtering-processed security coding sequence feature, input the filtering-processed security coding sequence feature into the target multimodal AI model, so that the target multimodal AI model outputs an output result corresponding to the filtering-processed security coding sequence feature;

an evaluation unit 630, configured to, in a case where the detection result in the detection stage is that the target multimodal AI model has a security problem, perform an omnidirectional comprehensive performance evaluation on the target multimodal AI model, comprising: performing multi-dimensional evaluation on the target multimodal AI model according to a plurality of preset evaluation dimensions to obtain a score of the target multimodal AI model corresponding to each evaluation dimension in the plurality of evaluation dimensions; determining a comprehensive score of the target multimodal AI model by using a correlation-based re-normalization method according to the score of each evaluation dimension.

In some embodiments, the detecting unit 610 obtaining the detection data of which the perceptual distance from the original data meets the requirement according to the perceptual distance between the detection data and the original data determined by the trained distance-aware judgment model comprises:

generating corresponding detection data according to the original data and a detection target;

determining a perceptual distance between the original data and the detection data by using the trained distance-aware judgment model;

in a case that the perceptual distance between the original data and the detection data does not meet the requirement, regenerating corresponding detection data according to the original data and the detection target, and re-determining the perceptual distance between the original data and currently generated detection data;

in a case that the perceptual distance between the original data and the detection data meets the requirement, using currently generated detection data as detection data for detecting the target multimodal AI model.

In some embodiments, the distance-aware judgment model adopts a multi-level transformer block cascade architecture;

for any original data, the perceptual distance between the original data and the detection data is determined by:

processing the original data using each Transformer block in the multi-cascade Transformer blocks to obtain an original feature, and processing the detection data by using each Transformer block in the multi-cascade Transformer blocks to obtain a detection feature; wherein the each Transformer block in the multi-cascade Transformer blocks respectively processes a part of the original data/detection data, and the original feature/detection feature is obtained by cascading output of each Transformer block and performing normalization;

determining a distance from the original data to a target mean value and a distance from the detection data to the target mean value according to the original feature and the detection feature;

determining a perceptual distance between the original data and the detection data according to the distance from the original data to the target mean value and the distance from the detection data to the target mean value.

In some embodiments, the security encoder is trained by:

obtaining a training data set for a specific task domain, wherein the training data set is characterized by multimodal input information and takes a security terminology corpus of the specific task domain (predefined domain-specific secure tokens) as a ground-truth label;

inputting input information of each modality and combined input information obtained by combining the input information of different modalities to a to-be-trained security encoder, so that the to-be-trained security encoder encodes the input information of each modality and the combined input information through a plurality of parallel Transformers to obtain a coding sequence corresponding to the input information of each modality and a coding sequence corresponding to the combined input information;

integrating the output of the plurality of parallel Transformers by using the cross-attention module to obtain an output of the security encoder;

determining a loss of the to-be-trained security encoder according to consistency between the output of the security encoder corresponding to the multimodal input information and the security terminology corpus corresponding to the multimodal input information, and optimizing the to-be-trained security encoder according to the loss of the to-be-trained security coder until a preset training ending condition is met; wherein the consistency between the output of the security encoder corresponding to the multimodal input information and the security terminology corpus corresponding to the multimodal input information is negatively correlated with the loss of the security encoder.

In some embodiments, the protection unit 620 performs filtering detection on the obtained tokens, including:

for any token, encoding the token by using a task encoder, inputting an encoded result into the target multimodal AI model, and determining whether the token is malicious according to an output result of the target multimodal AI model;

expanding the token according to a pre-established Semantically ambiguous sentence template, coding an expanded result by using a task encoder, inputting a coded result into the target multimodal AI model, and determining whether semantic deviation exists between the coded result and the sentence template according to an output result of the target multimodal AI model;

determining the token as a token needing to be filtered out in a case that at least one of following conditions is met: the token is malicious, and semantic deviation exists between the coded result and the sentence template.

In some embodiments, the evaluating unit 630 performs the multi-dimensional evaluation on the target multimodal AI model according to a plurality of preset evaluation dimensions to obtain the score of the target multimodal AI model corresponding to each evaluation dimension in the plurality of evaluation dimensions comprising:

for any one of the plurality of preset evaluation dimensions, in a case that a data set corresponding to the evaluation dimension is encoded by a security encoder and subject to tokenization filtering processing, inputting the data set to the target multimodal AI model to obtain an output of the target multimodal AI model;

evaluating the output of the target multimodal AI model by using an evaluation model of the evaluation dimension to obtain a score of the target multimodal AI model corresponding to the evaluation dimension.

In some embodiments, the evaluation unit 630 determines the comprehensive score of the target multimodal AI model by using the correlation-based re-normalization method according to the score of each evaluation dimension comprising:

according to a weight of each evaluation dimension, weighting the score of each evaluation dimension to obtain the comprehensive score of the target multimodal AI model, wherein the weight of each evaluation dimension is determined according to correlation between the evaluation dimensions.

An embodiment of the present disclosure further provides an electronic device, comprising a processor and a storage, where the storage is used for storing a computer program, and the processor is used for performing the systematic security protection method for a multimodal AI model described above when executing the program stored in the storage.

Figure 7:
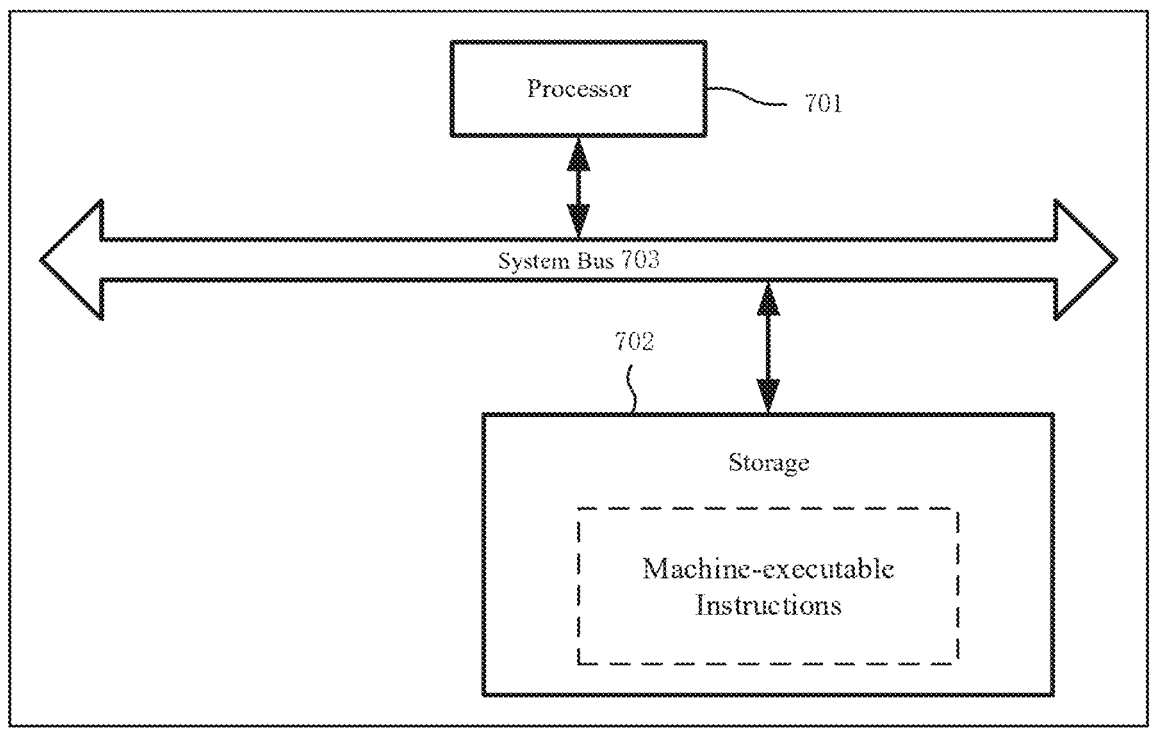
FIG. 7 is a schematic diagram illustrating a hardware structure of an electronic device according to an example of the present disclosure.

Referring to FIG. 7, FIG. 7 is a schematic diagram illustrating a hardware structure of an electronic device according to an embodiment of the present disclosure. The electronic device may include a processor 701, a storage 702 in which machine-executable instructions are stored. The processor 701 and the storage 702 may communicate via a system bus 703. In addition, by reading and executing the machine-executable instructions corresponding to the systematic security protection logic for a multimodal AI model for the multimodal AI model in the storage 702, the processor 701 may perform the systematic security protection method for a multimodal AI model described above.

The storage 702, as referred to herein, may be any electronic, magnetic, optical, or other physical storage device that may contain or store information such as executable instructions, data, etc. for example, a machine-readable storage medium may be, Radom Access Memory (RAM), volatile memory, non-volatile memory, flash memory, a storage drive (such as a hard drive), a solid state disk, any type of storage disc (such as an optical disc, DVD, etc.), or a similar storage medium, or a combination of them.

In some embodiments, there is also provided a machine-readable storage medium, such as storage 702 in FIG. 7, having stored therein machine-executable instructions that, when executed by a processor, case the processor to perform the systematic security protection method for a multimodal AI model described above. For example, the machine-readable storage medium may be an ROM, RAM, CD-ROM, magnetic tape, floppy disk, optical data storage device, and the like.

An embodiment of the present disclosure further provides a computer program product storing a computer program, and when the computer program is executed by a processor, causing the processor to perform the systematic security protection method for a multimodal AI model described above.

It is noted that relational terms such as first and second and the like may be used herein only to distinguish one entity or operation from another entity or operation without necessarily requiring or implying any such actual relationship or order between such entities or operations. Moreover, the terms "comprises," "comprising," or any other variation thereof, are intended to cover a non-exclusive inclusion, such that a process, method, article, or devices that comprises a list of elements does not include only those elements but may include other elements not expressly listed or inherent to such process, method, article, or apparatus. Without further restriction, an element defined by the statement "including a . . . " does not preclude the presence of another identical element in the process, method, article, or apparatus comprising the element.

The above description are only a preferred embodiments of the present disclosure, and are not intended to limit the present disclosure. Any modification, equivalent substitution, improvement, etc. made within the spirit and principle of the present disclosure shall be included in the scope of protection of this disclosure.

What is claimed is:

1. A systematic security protection method for a Multimodal Artificial Intelligence (AI) Model, comprising:

obtaining detection data of which a perceptual distance from the original data meets a requirement, and detecting the target multimodal AI model by using the obtained detection data in a security detection stage of a target multimodal AI model, according to a perceptual distance between detection data and original data determined by a trained distance-aware judgment model; wherein the detection data is generated according to the original data, and the perceptual distance between the detection data and the original data is determined by the distance-aware judgment model according to a distance from an original feature to a target mean value and a distance from a detection feature to the target mean value, wherein the original feature is a feature obtained through processing input original data by the distance-aware judgment model; the detection feature is a feature obtained through processing input detection data by the distance-aware judgment model; the target mean value is an average of the original feature and the detection feature across all dimensions of a feature space;

performing security encoding protection on input of the target multimodal AI model by using a trained security encoder to obtain a security coding sequence feature, in a case where a detection result in the detection stage is that the target multimodal AI model has a security problem; wherein the security encoder adopts a multi-stream multimodal Transformer network architecture, and the multi-stream multimodal Transformer network architecture comprises a plurality of parallel Transformers and a cross-attention module responsible for information interaction among modalities, the plurality of parallel Transformers are respectively used for modeling coding sequences of different modalities, and the cross-attention module is used for integrating outputs of the plurality of parallel Transformers;

performing term tokenization processing on the security coding sequence feature to obtain tokens, and performing filtering detection on the obtained tokens;

filtering the token, and performing gap filling on the security coding sequence feature having filtered the token to obtain a filtering-processed security coding sequence feature, in a case where a token needed to be filtered is detected;

inputting the filtering-processed security coding sequence feature into the target multimodal AI model, so that the target multimodal AI model outputs an output result corresponding to the filtering-processed security coding sequence feature;

performing an omnidirectional comprehensive performance evaluation on the target multimodal AI model, in a case where the detection result in the detection stage is that the target multimodal AI model has a security problem, comprising:

performing a multi-dimensional evaluation on the target multimodal AI model according to a plurality of preset evaluation dimensions to obtain a score of the target multimodal AI model corresponding to each evaluation dimension in the plurality of evaluation dimensions; and determining a comprehensive score of the target multimodal AI model by using a correlation-based re-normalization method according to the score of each evaluation dimension;

wherein performing the filtering detection on the obtained tokens comprises:

for any token, encoding the token by using a task encoder, inputting an encoded result into the target multimodal, AI model, and determining whether the token is malicious according to an output result of the target multimodal AI model:

expanding the token according to a pre-established Semantically ambiguous sentence template, coding an expanded result by using a task encoder, inputting a coded result into the target multimodal AI model, and determining whether semantic deviation exists between the coded result and the sentence template according to an output result of the target multimodal AI model;

determining the token as a token needed to be filtered out in a case that at least one of following conditions is met: the token being malicious, or semantic division existing between the coded result and the sentence template;

wherein obtaining the detection data of which the perceptual distance from the original data meets the requirement according to the perceptual distance between the detection data and the original data determined by the trained distance-aware judgment model comprises:

generating corresponding detection data according to the original data and a detection target;

determining a perceptual distance between the original data and the detection data by using the trained distance-aware judgment model;

in a case that the perceptual distance between the original data and the detection data does not meet the requirement, regenerating corresponding detection data according to the original data and the detection target, and re-determining the perceptual distance between the original data and currently generated detection data; and in a case that the perceptual distance between the original data and the detection data meets the requirement, using currently generated detection data as detection data for detecting the target multimodal AI model.

2. The method of claim 1, wherein the distance-aware judgment model adopts a multi-level transformer block cascade architecture;

for any original data, the perceptual distance between the original data and the detection data is determined by:

processing the original data using each Transformer block in the multi-cascade Transformer blocks to obtain an original feature, and processing the detection data by using each Transformer block in the multi-cascade Transformer blocks to obtain a detection feature; wherein the each Transformer block in the multi-cascade Transformer blocks respectively processes a part of the original data/detection data, and the original feature/detection feature is obtained by cascading output of each Transformer block and performing normalization;

determining a distance from the original data to a target mean value and a distance from the detection data to the target mean value according to the original feature and the detection feature;

determining a perceptual distance between the original data and the detection data according to the distance from the original data to the target mean value and the distance from the detection data to the target mean value.

3. The method of claim 1, wherein the security encoder is trained by:

obtaining a training data set for a specific task domain, wherein the training data set is characterized by multimodal input information and takes a security terminology corpus of the specific task domain as a ground-truth label;

inputting input information of each modality and combined input information obtained by combining the input information of different modalities to a to-be-trained security encoder, so that the to-be-trained security encoder encodes the input information of each modality and the combined input information through a plurality of parallel Transformers to obtain a coding sequence corresponding to the input information of each modality and a coding sequence corresponding to the combined input information, integrating the output of the plurality of parallel Transformers by using the cross-attention module to obtain an output of the security encoder;

determining a loss of the to-be-trained security encoder according to consistency between the output of the security encoder corresponding to the multimodal input information and the security terminology corpus corresponding to the multimodal input information, and optimizing the to-be-trained security encoder according to the loss of the to-be-trained security coder until a preset training ending condition is met, wherein the consistency between the output of the security encoder corresponding to the multimodal input information and the security terminology corpus corresponding to the multimodal input information is negatively correlated with the loss of the security encoder.

4. The method of claim 1, wherein performing the multidimensional evaluation on the target multimodal AI model according to a plurality of preset evaluation dimensions to obtain the score of the target multimodal AI model corresponding to each evaluation dimension in the plurality of evaluation dimensions comprises:

for any one of the plurality of preset evaluation dimensions, in a case that a data set corresponding to the evaluation dimension is encoded by a security encoder and subject to tokenization filtering processing, inputting the data set to the target multimodal AI model to obtain an output of the target multimodal AI model;

evaluating the output of the target multimodal AI model by using an evaluation model of the evaluation dimension to obtain a score of the target multimodal AI model corresponding to the evaluation dimension.

5. The method of claim 1, wherein determining the comprehensive score of the target multimodal AI model by using the correlation-based re-normalization method according to the score of each evaluation dimension comprises:

according to a weight of each evaluation dimension, weighting the score of each evaluation dimension to obtain the comprehensive score of the target multimodal AI model, wherein the weight of each evaluation dimension is determined according to correlation between the evaluation dimensions.

6. An electronic device, wherein the electronic device comprises at least one processor and at least one memory having a computer program stored thereon, wherein the at least one processor is configured to perform the method according to claim 1 when executing the program stored on the at least one memory.

7. A computer program product stored on a non-transitory computer-readable storage medium and storing a computer program which, when executed by a processor, cause the processor to perform the method according to claim 1.

8. A systematic security protection apparatus for a multimodal AI model, comprising:

a detection unit, configured to, obtain detection data of which a perceptual distance from the original data meets a requirement, and detect the target multimodal AI model by using the obtained detection data in a security detection stage of the target multimodal AI model, according to a perceptual distance between detection data and original data determined by a trained distance-aware judgment model; wherein the detection data is generated according to the original data, and the perceptual distance between the original data and the detection data is determined by the distance-aware judgment model according to a distance from an original feature to a target mean value and a distance from a detection feature to the target mean value, wherein the original feature is a feature obtained through processing input original data by the distance-aware judgment model; the detection feature is a feature obtained through processing input detection data by the distance-aware judgment model; the target mean value is an average of the original feature and the detection feature across all dimensions of a feature space;

a protection unit, configured to perform security encoding protection on input of the target multimodal AI model by using a trained security encoder to obtain a security coding sequence feature, in a case where a detection result in the detection stage is that the target multimodal AI model has a security problem; wherein the security encoder is configured to adopt a multi-stream multi-modal Transformer network architecture, and the multi-stream multi-modal Transformer network architecture comprises a plurality of parallel Transformers and a cross-attention module responsible for information interaction among modalities, the plurality of parallel Transformers are respectively used for modeling coding sequences of different modalities, and the cross-attention module is used for integrating outputs of the plurality of parallel transformers, perform term tokenization processing on the security coding sequence feature to obtain token, and perform filtering detection on the obtained tokens;

filter the token, and perform gap filling on the security coding sequence feature having filtered the token to obtain a filtering-processed security coding sequence feature in a case where a token needed to be filtered is detected, input the filtering-processed security coding sequence feature into the target multimodal AI model, so that the target multimodal AI model outputs an output result corresponding to the filtering-processed security coding sequence feature; and an evaluation unit, configured to perform an omnidirectional comprehensive performance evaluation on the target multimodal AI model in a case where a token needed to be filtered is detected, comprising:

perform multi-dimensional evaluation on the target multimodal AI model according to a plurality of preset evaluation dimensions to obtain a score of the target multimodal AI model corresponding to each evaluation dimension in the plurality of evaluation dimensions;

determine a comprehensive score of the target multimodal AI model by using a correlation-based re-normalization method according to the score of each evaluation dimension, wherein when performing the filtering detection on the obtained tokens, the protection unit is further configured to:

for any token, encode the token by using a task encoder, input an encoded result into the target multimodal AI model, and determine whether the token is malicious according to an output result of the target multimodal AI model;

expand the token according to a pre-established Semantically ambiguous sentence template, code an expanded result by using a task encoder, input a coded result into the target multimodal AI model, and determine whether semantic deviation exists between the coded result and the sentence template according to an output result of the target multimodal AI model; and determine the token as a token needing to be filtered out in a case that at least one of following conditions is met: the token is malicious, and semantic deviation exists between the coded result and the sentence template, and wherein, when obtaining the detection data of which the perceptual distance from the original data meets the requirement according to the perceptual distance between the detection data and the original data determined by the trained distance-aware judgment model, the detection unit is further configured to:

generate corresponding detection data according to the original data and a detection target;

determine a perceptual distance between the original data and the detection data by using the trained distance-aware judgment model;

in a case that the perceptual distance between the original data and the detection data does not meet the requirement, regenerate corresponding detection data according to the original data and the detection target, and re-determine the perceptual distance between the original data and currently generated detection data; and in a case that the perceptual distance between the original data and the detection data meets the requirement, use currently generated detection data as detection data for detecting the target multimodal AI model.

* * * * *